United States Patent
So

(10) Patent No.: US 8,922,363 B2
(45) Date of Patent: Dec. 30, 2014

(54) ANIMAL TRAINING APPARATUS FOR LOCATING COLLAR TRANSCEIVER USING GPS AND METHOD OF CONTROLLING THE SAME

(76) Inventor: Min Jae So, Seoul (KR)

( * ) Notice: Subject to any disclaimer, the term of this patent is extended or adjusted under 35 U.S.C. 154(b) by 107 days.

(21) Appl. No.: 13/290,993

(22) Filed: Nov. 7, 2011

(65) Prior Publication Data

US 2013/0113621 A1    May 9, 2013

(51) Int. Cl.
*G08B 1/08* (2006.01)
*A01K 15/02* (2006.01)
*A01K 27/00* (2006.01)
*G08B 21/02* (2006.01)
*A01K 11/00* (2006.01)

(52) U.S. Cl.
CPC .......... *A01K 15/023* (2013.01); *A01K 27/009* (2013.01); *G08B 21/0269* (2013.01); *A01K 11/008* (2013.01); *Y10S 119/908* (2013.01)
USPC ............... 340/539.1; 340/539.13; 340/539.2; 340/573.1; 340/573.3; 119/719; 119/720; 119/721; 119/859; 119/908

(58) Field of Classification Search
None
See application file for complete search history.

(56) References Cited

U.S. PATENT DOCUMENTS

| | | | | |
|---|---|---|---|---|
| 5,857,433 A | * | 1/1999 | Files | 119/720 |
| 5,868,100 A | * | 2/1999 | Marsh | 119/421 |
| 6,019,066 A | * | 2/2000 | Taylor | 119/720 |
| 7,602,302 B2 | * | 10/2009 | Hokuf et al. | 340/573.3 |
| 2009/0102668 A1 | * | 4/2009 | Thompson et al. | 340/573.3 |
| 2011/0061605 A1 | * | 3/2011 | Hardi et al. | 119/721 |

* cited by examiner

*Primary Examiner* — Curtis King
(74) *Attorney, Agent, or Firm* — John K. Park; Park Law Firm

(57) ABSTRACT

Disclosed herein are an animal training apparatus for locating a collar transceiver using a Global Positioning System (GPS), and a method of controlling the the same. The animal training apparatus includes a portable device, and a collar transceiver. The portable device includes a portable device GPS reception unit, a key input unit, a portable device control unit, a display unit, and a portable device wireless communication unit. The collar transceiver includes a collar wireless communication unit, a collar GPS reception unit, a photodetector, a light output unit, a beep tone output unit, and a collar control unit.

5 Claims, 15 Drawing Sheets

– Prior Art –

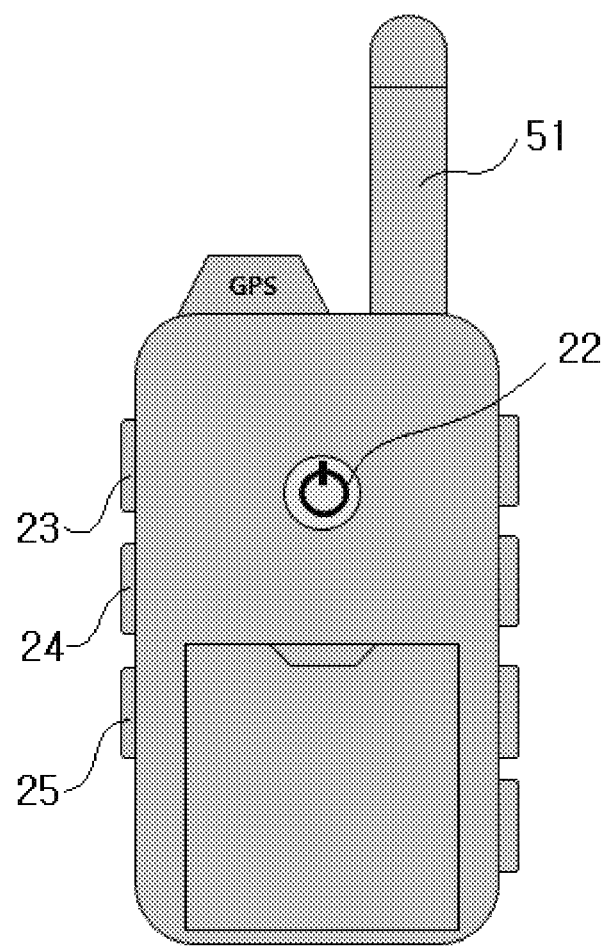

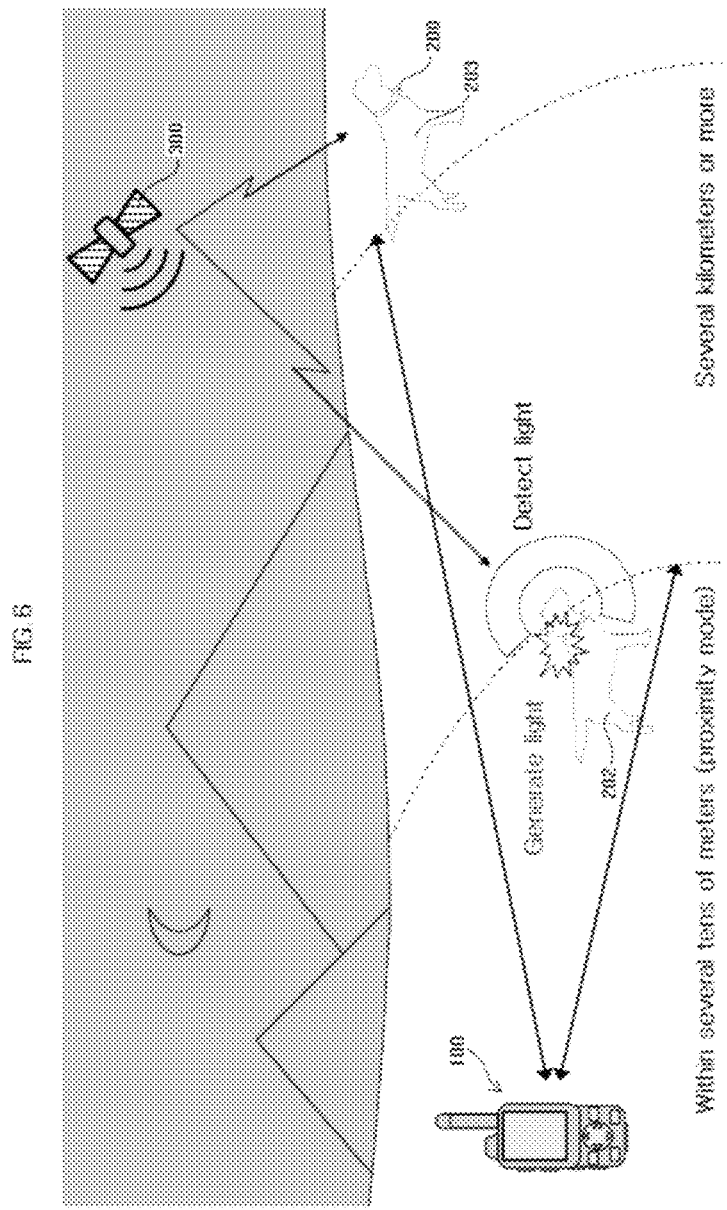

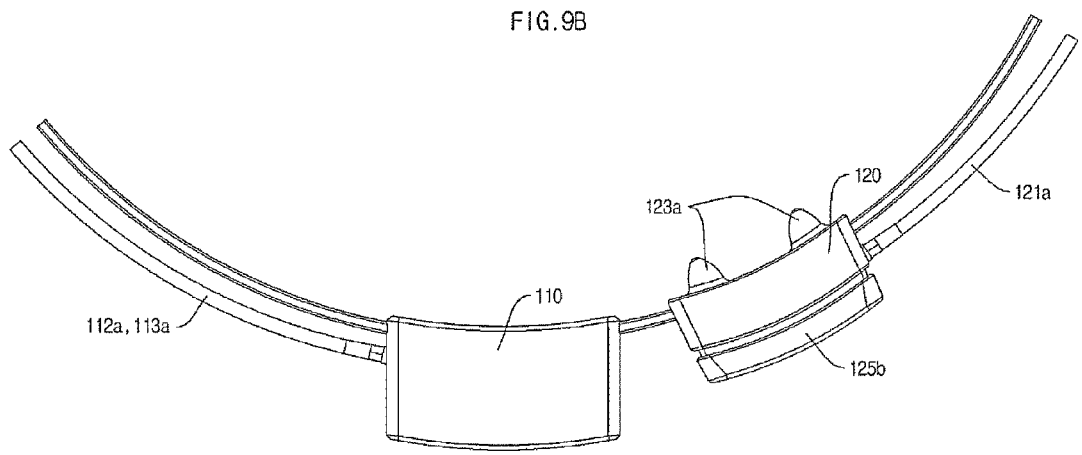

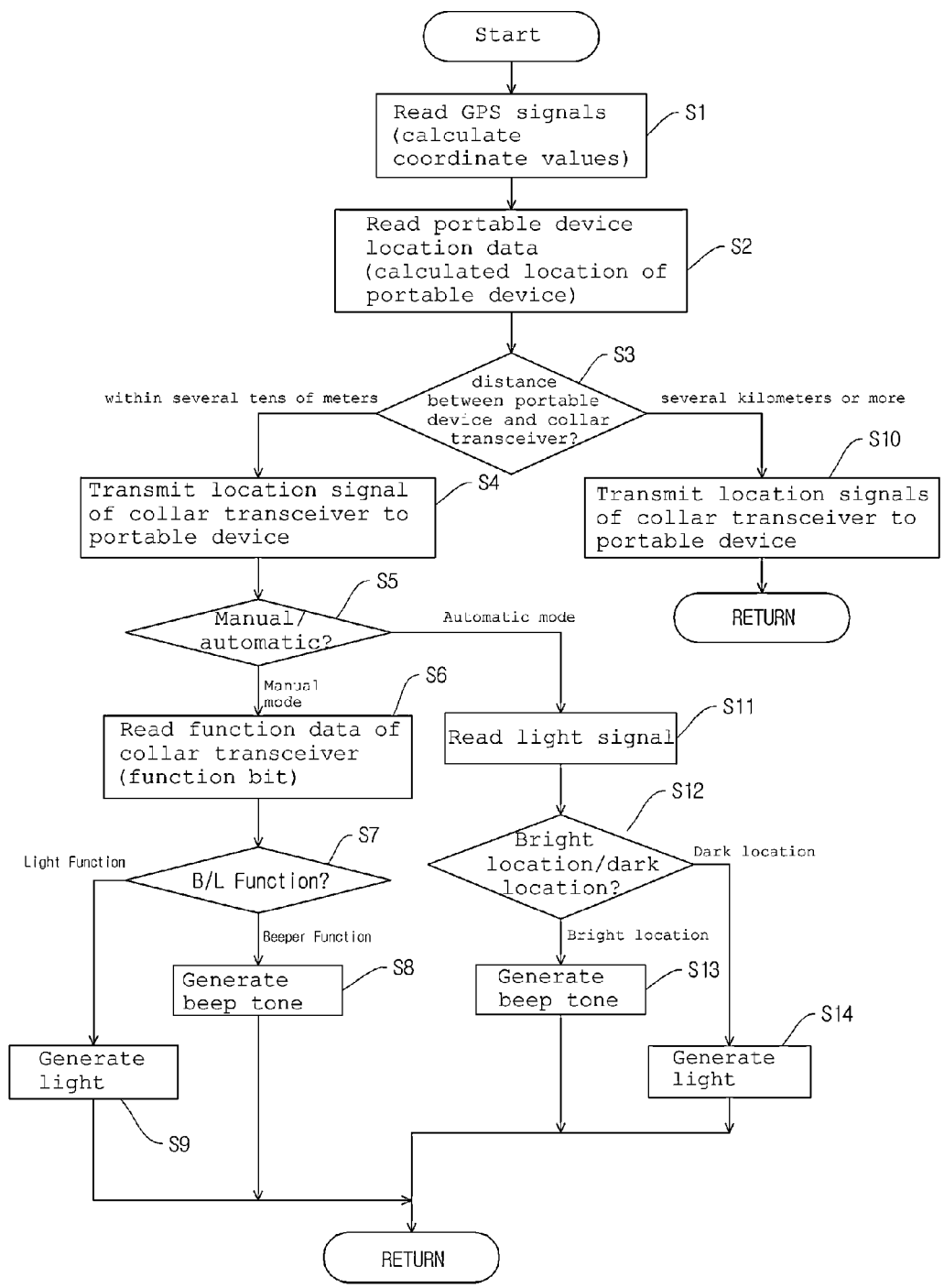

ANIMAL TRAINING APPARATUS FOR LOCATING COLLAR TRANSCEIVER USING GPS AND METHOD OF CONTROLLING THE SAME

BACKGROUND OF THE INVENTION

1. Technical Field

The present invention relates generally to an animal training apparatus for locating a collar transceiver using a Global Positioning System (GPS) and a method of controlling the animal training apparatus and, more particularly, to an animal training apparatus for locating a collar transceiver using a GPS, wherein GPS receivers are installed in a portable device and a collar transceiver, respectively, and the collar transceiver receives an automatic mode signal from the portable device, receives the location signals of the portable device, and generates a beep tone at a bright location and light at a dark location when the portable device approaches a location at which the beep tone generated from the collar transceiver can be heard or light can be observed so that the collar transceiver can be located by the portable device, and a method of controlling the animal training apparatus.

2. Description of the Related Art

GPS is an artificial satellite navigation system which receives location signals from GPS satellites and calculates the current location of a user. Global Positioning Systems (GPSs) are chiefly used in navigation devices for aircraft, ships, and vehicles. GPSs are recently used even in animal training apparatuses which train animals, such as hounds, from remote locations.

In such an animal training apparatus for locating a remote dog (receiver) using GPS signals (coordinate signals), when a location is detected using only GPS signals, a transmitter indicates that the location of the receiver has been detected due to a common tolerance when the distance between the portable device and the receiver is several tens of meters.

The transmitter indicates that the location of the receiver has been detected, but it is difficult to accurately locate it with the naked eye within several tens of meters because the range of visibility is short in deep mountains.

A system for providing notification that a pet has lost its way when the pet becomes lost is disclosed in U.S. Pat. No. 6,067,018.

The major elements of the lost pet notification system include a pet collar 1, a portable unit 5, and a base station 7. The collar 1 includes a housing which supports an alarm device including a speaker 1a. The pet collar 1 generates a loud sound or one or more rays of light using Light-Emitting Diodes (LEDs) 1c.

The portable unit 5 is a handheld device which generates polling signals to be transmitted to the pet collar 1 over a communication link. The pet collar 1 replys to the portable unit 5 by sending a reply signal to the portable unit 5 whenever the pet collar 1 receives a polling signal. This operation continues while the pet collar 1 stays within the transmissible range of the portable unit 5.

When the pet moves out of the transmissible range, the pet collar 1 cannot receive the polling signal anymore. If the pet collar 1 does not detect the polling signal for a predetermined period of time, the pet collar 1 automatically enters an alarm state.

Likewise, if the portable unit 5 does not receive a reply signal after sending a predetermined number of polling signals, the portable unit 5 automatically enters an alarm state.

When the alarm state is entered, the pet collar 1 generates a high pitched noise using the speaker 1a and generates rays of light using the LEDs 1c in order to warn passengers near the pet that the pet has lost its way.

In addition to the actuation of the alarm device, the portable unit 5 automatically transmits a notification signal to the base station 7. The base station 7 automatically makes a phone call to a remote telephone 8 over a telephone network in response to the notification signal.

Once a user answers the phone call, the base station 7 displays a message, providing notification that the pet has wandered out of the range of transmission, to the owner of the pet. The base station 7 repeats this processing and displays the message a stored number of times. The portable unit 5 may use wireless communication when it is not located within the coverage of the base station 7.

When the notification signal is received, the base station 7 automatically makes at least one phone call and displays a previously stored message. The message is transferred over a telephone network via a conventional telephone office 9. A telephone number and a related message are respectively selected from among a number of telephone numbers and related messages stored in the base station.

The conventional system is problematic in that although notification that a pet is lost can be provided, it does not inform the user of the location of a pet wearing a receiver in an area where the range of visibility is narrow, such as deep in the mountains.

SUMMARY OF THE INVENTION

Accordingly, the present invention has been made keeping in mind the above problems occurring in the prior art, and an object of the present invention is to provide an animal training apparatus for locating a collar transceiver using a GPS and a method of controlling the animal training apparatus, which are capable of calculating the distance between a portable device carried by a trainer and the collar transceiver worn on an animal using the animal training apparatus having a GPS function, and displaying the portable device and the collar transceiver on a display unit or generating a beep tone or light depending on the distance in order to inform about the location of the collar transceiver.

Another object of the present invention is to provide an animal training apparatus for locating a collar transceiver using GPS and a method of controlling the animal training apparatus, which, when GPS signals indicate because of a tolerance that a lost pet wearing the collar transceiver has been found but the lost pet is not able to be observed with the naked eye deep in the mountains where the range of visibility is short, are capable of informing about the location of the collar transceiver by generating a beep tone at a bright location and light at a dark location.

In order to accomplish the above objects, the animal training apparatus according to the present invention calculates the distance to the collar transceiver using GPS signals in order to locate the collar transceiver in such a situation, switches to proximity mode when the distance is within several tens of meters, and generates a beep tone or light using the function signal of the portable device in manual mode.

According to one aspect of the present invention, there is provided an animal training apparatus for locating a collar transceiver using a Global Positioning System (GPS), the animal training apparatus including a portable device including a portable device GPS reception unit configured to be carried by a trainer or the owner of a pet and to receive GPS signals from GPS satellites and then extract location signals from the GPS signals; a key input unit configured to receive and then output data and command signals input by a user; a portable device control unit configured to control the elements of the portable device based on the command signals received from the key input unit and to perform control so that the location signals received from the portable device GPS reception unit are output to a collar transceiver via a portable device wireless communication unit; a display unit configured to display the operating status of the portable device and data under control of the portable device control unit; and a portable device wireless communication unit configured to transmit data to the collar transceiver under control of the portable device control unit; and a collar transceiver including a collar wireless communication unit worn on a pet, a wild animal, or a body of an object which is desired to be located, and configured to receive radio signals, including a variety of data and command signals, from the portable device; a collar GPS reception unit configured to extract location signals from GPS signals received from GPS satellites; a photodetector configured to detect sunlight or ambient light and to output a detection signal; a light output unit configured to output light under control of the collar control unit; a beep tone output unit configured to output a beep tone under control of the collar control unit; and a collar control unit configured to control the elements of the collar transceiver, to receive location signals of the collar transceiver from the collar GPS reception unit and a location signal of the portable device from the portable device, to perform control so that the light output unit generates light, informing the user of the location of the collar transceiver, when an automatic mode signal is received in the evening or at night when weak illumination is provided by the sunlight in response to a photo detection signal detected by the photodetector depending on the distance between the collar transceiver and the portable device, to detect an illumination of sunlight in response to the photo detection signal of the photodetector, and to perform control so that the beep tone output unit generates a beep tone at a bright location based on the illumination of sunlight.

The key input unit may include a level setting button for setting a level of vibrations or shocks of the collar transceiver, an on/off button for turning on/off power, a beep tone output button for outputting a beep tone in manual mode, a light output button for outputting light in the manual mode, and a manual/automatic selection button for selecting the manual mode in which the beep tone output and the light output are manually operated and an automatic mode in which the beep tone output and the light output automatically operate.

The portable device control unit may download geographical information from a geographical information server via the portable device wireless communication unit, store the downloaded geographical information in internal memory, receive the location signals from the portable device GPS reception unit, and display locations of the portable device and the collar transceiver, together with the geographical information, on the display unit.

The collar control unit may receive the location signals of the collar transceiver from the collar GPS reception unit and the automatic mode signal from the portable device, set the collar transceiver to automatic mode, compare the locations of the collar transceiver and the portable device if it is determined that the illumination of sunlight detected by the photodetector corresponds to a bright location, and control the beep tone output unit so that the beep tone is generated depending on the distance between the portable device and the collar transceiver, compare the locations of the collar transceiver and the portable device if it is determined that the illumination of sunlight detected by the photodetector corresponds to a bright location, and control the light output unit so that the LEDs generate the light depending on the distance between the portable device and the collar transceiver.

According to another aspect of the present invention, there is provided a method of controlling an animal training apparatus for locating a collar transceiver using a Global Positioning System (GPS), comprising the steps of: in a collar control unit of the collar transceiver; (a) receiving location signals from a collar GPS reception unit, calculating coordinate values indicative of a location of a collar transceiver, receiving location signals of a portable device from a collar wireless communication unit, and calculating coordinate values indicative of a location of the portable device; (b) calculating a distance between the portable device and the collar transceiver based on the coordinate values indicative of the location of the collar transceiver and the coordinate values indicative of the location of the portable device, and displaying the locations of the portable device and the collar transceiver, together with a map downloaded from a geographical information server, on a display unit of the portable device if the calculated distance is several kilometers or more; (c) if the distance between the portable device and the collar transceiver is calculated and the calculated distance is within several tens of meters at step (b), determining whether manual mode selection key or automatic mode selection key of the portable device has been pressed via the collar wireless communication unit; (d) if, as a result of the determination at step (c), it is determined that the manual mode selection key has been pressed, setting the collar transceiver to manual mode, reading a current function of the collar transceiver, and determining whether the collar transceiver has been set to a beep tone generation function or a light generation function; (e) if, as a result of the determination at step (d), it is determined that the collar transceiver has been set to the beep tone generation function, controlling a beep tone output unit so that the beep tone output unit generates a beep tone, and then returning to a main program; (f) if, as a result of the determination at step (d), it is determined that the collar transceiver has been set to the light generation function, controlling a light output unit so that a plurality of LEDs generates light, and then returning to the main program; (g) if, as a result of the determination at step (c), it is determined that the automatic mode selection key has been pressed, setting the collar transceiver to automatic mode, detecting an illumination of sunlight received from a photodetector, and determining whether the detected illumination of sunlight corresponds to a bright location or a dark location; and (h) if, as a result of the determination at step (g), it is determined that the detected illumination of sunlight corresponds to the bright location, controlling the beep tone output unit so that the beep tone output unit generates the beep tone, and then returning to the main program, or if, as a result of the determination at step (g), it is determined that the detected illumination of sunlight corresponds to the dark location, controlling a light output unit so that a plurality of LEDs generates the light.

BRIEF DESCRIPTION OF THE DRAWINGS

The above and other objects, features and advantages of the present invention will be more clearly understood from the following detailed description taken in conjunction with the accompanying drawings, in which:

FIGS. 3A and 3B are front and rear views showing an embodiment of a key input unit disposed outside the portable device according to the present invention;

FIG. 6 shows an embodiment in which the portable device and collar transceiver of the animal training apparatus according to the present invention generate rays of light when in a dark location where there is no sunlight in automatic mode;

FIGS. 9A, 9B, and 9C are perspective, front, and plan views showing a state in which the collar transceiver of the animal training apparatus according to the present invention is worn on a collar; and FIG. 10 is a flowchart illustrating a method of controlling the portable device and collar transceiver of the animal training apparatus according to the present invention.

DESCRIPTION OF THE PREFERRED EMBODIMENTS

Embodiments of the present invention will be described in detail below with reference to the accompanying drawings.

The present invention is not limited by the embodiments which will be disclosed below. The embodiments are provided to make the disclosure of the present invention complete and to allow those having ordinary skill in the art to fully understand the scope of the present invention.

Figure 1:
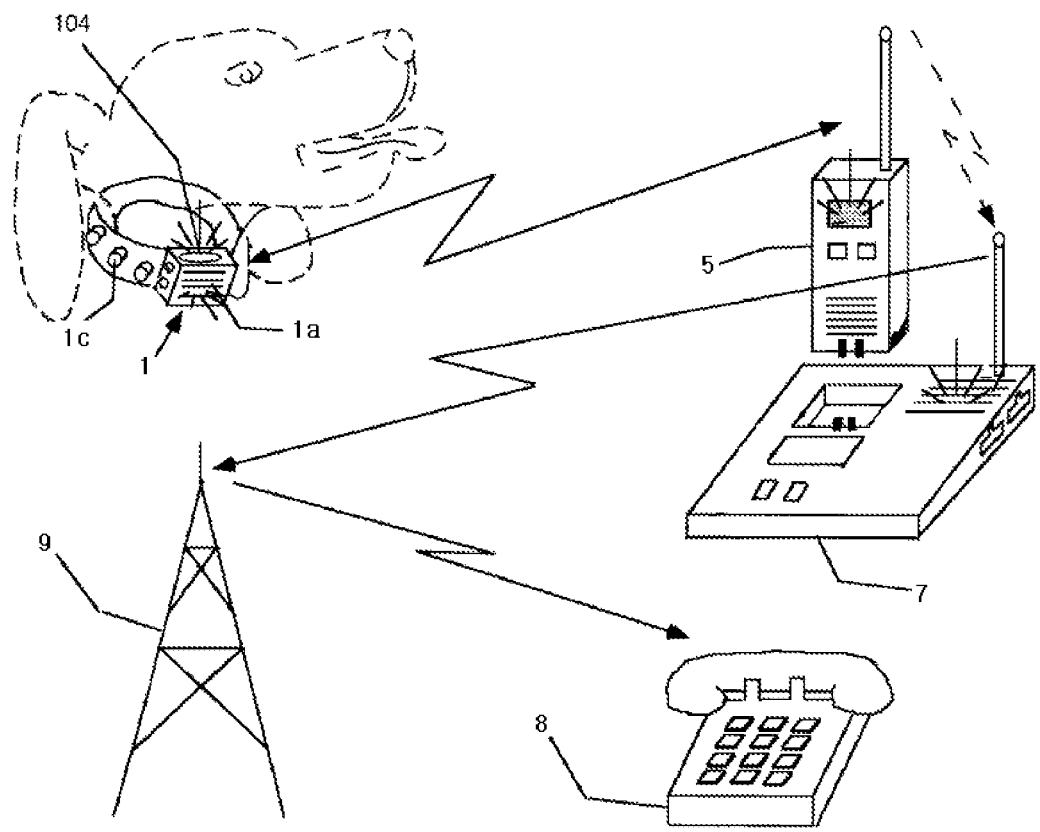
FIG. 1 shows a conventional lost pet notification system.
Figure 2:
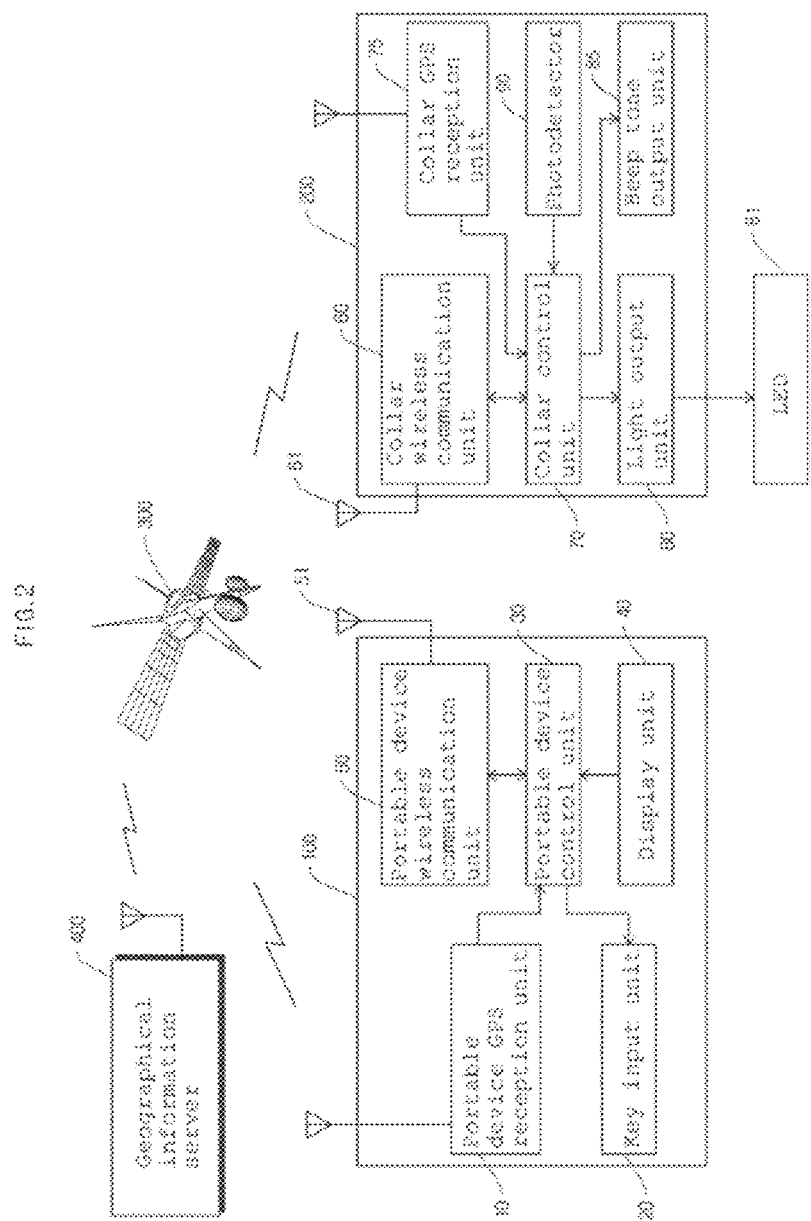
FIG. 2 is a block diagram showing the configuration of the portable device and collar transceiver of an animal training apparatus according to the present invention.

FIG. 2 is a block diagram showing the configuration of the portable device and collar transceiver of an animal training apparatus according to the present invention.

The portable device 100 according to the present invention includes a portable device GPS reception unit 10 configured to be carried by a trainer or the owner of a pet and to receive GPS signals from GPS satellites 300 and then extract location signals from the GPS signals; a key input unit 20 configured to receive and then output data and command signals input by a user; a portable device control unit 30 configured to control the elements of the portable device based on the command signals received from the key input unit and to perform control so that the location signals received from the portable device GPS reception unit 10 are output to a collar transceiver 200 via a portable device wireless communication unit 50; a display unit 40 configured to display the operating status of the portable device and data under the control of the portable device control unit 30; and a portable device wireless communication unit 50 configured to transmit data to the collar transceiver 200 under the control of the portable device control unit 30.

The collar transceiver 200 according to the present invention includes a collar wireless communication unit 60 worn on a pet, a wild animal, or the body of an object which is desired to be located, and configured to receive radio signals, including a variety of data and command signals, from the portable device 100; a collar GPS reception unit 75 configured to extract location signals from GPS signals received from GPS satellites 300; a photodetector 90 configured to detect sunlight or ambient light and to output a detection signal; a light output unit 80 configured to output light under the control of the collar control unit 70; a beep tone output unit 85 configured to output a beep tone under the control of the collar control unit 70; and a collar control unit 70 configured to control the elements of the collar transceiver 200, to receive the location signals of the collar transceiver 200 from the collar GPS reception unit 75 and the location signal of the portable device 100 from the portable device 100, to perform control so that the light output unit 80 generates light, informing the user of the location of the collar transceiver 200, when an automatic mode signal is received in the evening or at night when only weak illumination is provided by the sunlight in response to a photo detection signal detected by the photodetector 90 depending on the distance between the collar transceiver and the portable device, to detect the illumination of sunlight in response to the photo detection signal of the photodetector 90, and to perform control so that the beep tone output unit 85 generates a beep tone at a bright location based on the illumination of sunlight.

The portable device 100 according to the present invention is configured to be carried by a trainer or the owner of a pet. When a pet loses its way or when a hound chases game, fetches shot game or is searching for game shot at a distance in deep mountains, the location of the collar transceiver 200, together with geographical information (e.g., a map), is displayed on the display unit 40 so that the location of the pet or hound can be found. Accordingly, the location of the pet dog or the hound wearing the collar transceiver 200 can be displayed on a map.

The portable device GPS reception unit 10 receives GPS signals from the GPS satellites 300, extracts location signals based on which the location of the portable device 100 may be found from the GPS signals, and outputs the location signals to the portable device control unit 30.

The portable device control unit 30 may receive the location signals from the portable device GPS reception unit and display the location of the portable device 100, together with geographical information (e.g., a map), on the display unit 40. The geographical information is downloaded from a geographical information server 400 using the portable device wireless communication unit 50, is stored in internal memory, and is displayed on the display unit 40 under the control of the portable device control unit 30.

Figure 3A:
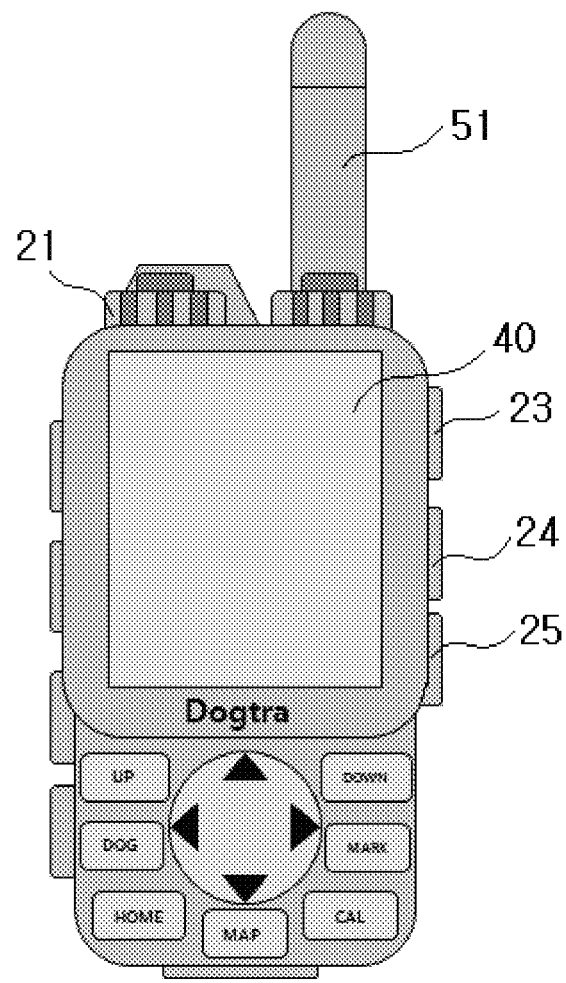

The key input unit 20 includes a number of buttons for inputting a variety of commands (e.g., an electrical shock supply command and a beep tone output command) and data (e.g., the level of electrical shocks and the volume of beep tones) to the portable device control unit 30. As shown in FIGS. 3A and 3B, the key input unit 20 further includes a level setting button 21 for setting the level of the vibrations or shocks of the collar transceiver 200, an on/off button 22 for turning on/off power, a beep tone output button 24 for outputting a beep tone in manual mode, a light output button 25 for outputting light in the manual mode, and a manual/automatic selection button 23 for selecting the manual mode in which the beep tone output and the light output are manually operated and an automatic mode in which the beep tone output and the light output are engaged in automatic operation.

The display unit 40 may be formed of, for example, a Liquid Crystal Display (LCD). The display unit 40 may display a variety of data and geographical information indicating the locations of the portable device 100 and the collar transceiver 200 under the control of the portable device control unit 30.

The portable device wireless communication unit 50 transmits a variety of data and the location signals, received from the portable device GPS reception unit 10, to the collar transceiver 200 under the control of the portable device control unit 30.

The collar transceiver 200 according to the present invention may be worn on a pet, a wild animal, or the body of an object which is desired to be located, and then be moved. The collar transceiver 200 performs an operation of applying an electrical shock to the pet, the wild animal, or the body of the object which is desired to be located, or generating a beep tone or light, indicating the location of the pet, the wild animal or the body of the object, in response to a radio signal received from the portable device 100.

The collar wireless communication unit 60 receives radio signals, including a variety of data and command signals, from the portable device 100, and outputs the radio signals to the collar control unit 70.

The collar GPS reception unit 75 receives GPS signals from the GPS satellites 300, extracts location signals, based on which the collar transceiver 200 may be located, from the GPS signals, and outputs the location signals to the collar control unit 70.

The photodetector 90 may be formed of a photocell CdS, a photodiode, or a photodiode which detects sunlight or ambient light and generates a photo detection signal. The photodetector 90 outputs the photo detection signal to the collar control unit 70.

The light output unit 80 generates light under the control of the collar control unit 70 so that the trainer or the owner of the pet carrying the portable device 100 may locate the collar transceiver 200.

The beep tone output unit 85 generates a beep tone under the control of the collar control unit 70 so that the trainer or the owner of the pet carrying the portable device 100 may listen to the beep tone and locate the collar transceiver 200 (the wild animal, the pet, or the object which is desired to be located).

The collar control unit 70 controls the elements of the collar transceiver 200, receives radio signals, including a variety of data and command signals, from the portable device 100, and performs operations in response to the command signals. When an automatic mode signal has been received from the portable device 100, the collar control unit 70 detects the illumination of sunlight based on a photo detection signal received from the photodetector 90, and the light output unit 80 generates light informing the trainer or the owner of the pet of the location of the collar transceiver 200 in the evening or at night when only weak illumination is provided by the sunlight.

Furthermore, when an automatic mode signal has been received, the collar control unit 70 receives the location signals, based on which the collar transceiver 200 can be located, from the collar GPS reception unit 75, compares the distance between the portable device 100 and the collar transceiver 200 with the location of the portable device 100 received from the portable device 100, and performs control so that the beep tone output unit 85 generates a beep tone if, as a result of the comparison, it is determined that the distance is one at which the trainer or the owner of the pet can hear the beep tone.

Figure 4:
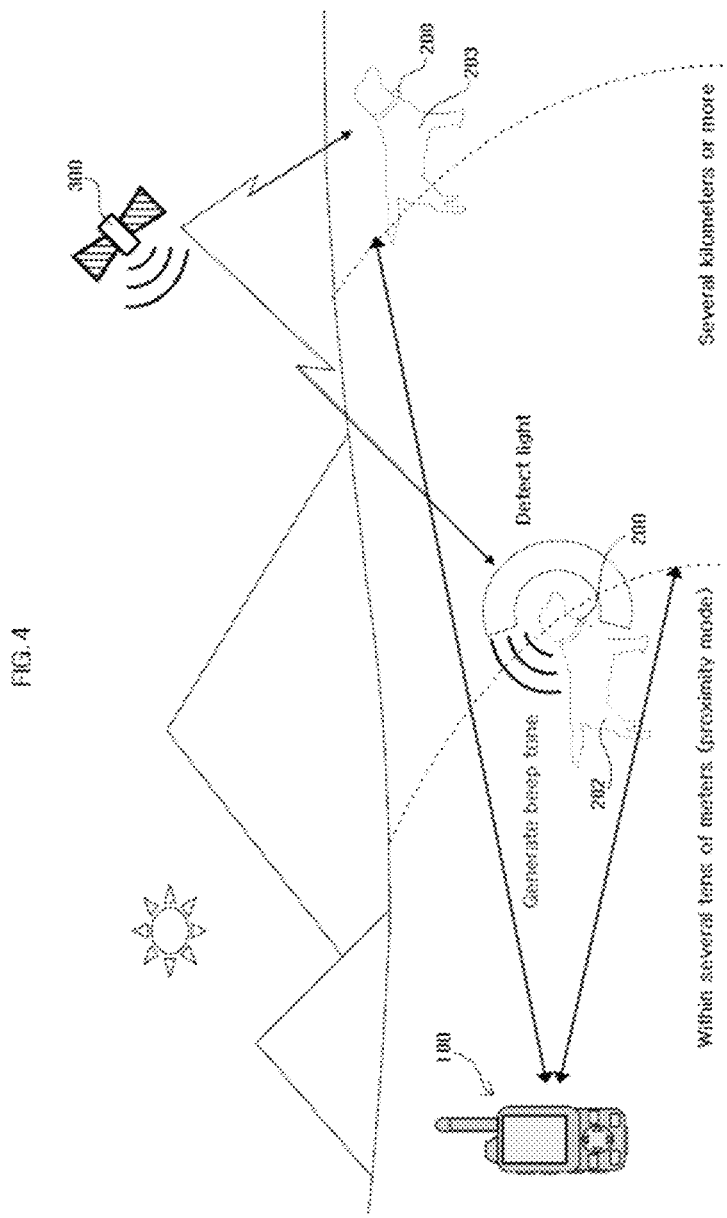
FIG. 4 shows an embodiment in which the portable device and collar transceiver of the animal training apparatus according to the present invention generate beep tones at a bright location where the sun rises in automatic mode.

FIG. 4 shows an embodiment in which the portable device and collar transceiver of the animal training apparatus according to the present invention generate beep tones at a bright location where the sun rises in automatic mode.

The collar control unit 70 of the collar transceiver 200 of the animal training apparatus according to the present invention receives an automatic mode signal from the portable device 100, sets the collar transceiver 200 to automatic mode, and then determines whether the illumination of sunlight detected by the photodetector 90 corresponds to a bright location or a dark location. If, as result of the determination, it is determined that the illumination of sunlight corresponds to the bright location and the distance between the portable device 100 and the collar transceiver 200 is several tens of meters, as shown in FIG. 4, the collar control unit 70 performs control so that the beep tone output unit 85 generates a beep tone.

When a hound 202 wearing the collar transceiver 200 chases game in the woods, the collar control unit 70 receives the location signals of the collar transceiver 200 from the collar GPS reception unit 75, receives the location signals of the portable device 100 from the collar wireless communication unit 60, and determines whether the distance between the portable device 100 and the collar transceiver 200 is one at which a beep tone can be heard by periodically calculating the locations of the portable device 100 and the collar transceiver 200.

When the owner of the hound chases the hound 202 and the distance between the portable device 100 and the collar transceiver 200 is within several tens of meters, the collar control unit 70 determines whether the illumination of sunlight detected by the photodetector 90 corresponds to a bright location. If, as a result of the determination, it is determined that the illumination of sunlight corresponds to the bright location, the collar control unit 70 performs control so that the beep tone output unit 85 generates a beep tone in order to inform the owner of the hound 202, who has approached a location several tens of meters away from the hound 202, of the location of the hound 202.

Furthermore, the collar control unit 70 periodically calculates the locations of the portable device 100 and the collar transceiver 200. If the distance between the portable device 100 and the collar transceiver 200 is one at which a beep tone cannot be heard (e.g., if the hound 203 is several kilometers away), the beep tone is not generated.

In this case, the portable device control unit 30 may access the geographical information server 400 using the GPS satellites 300, other communication satellites (not shown), or a relay (not shown), download geographical information about the locations at which the portable device 100 and the collar transceiver 200 are placed, and display the locations of the portable device 100 and the collar transceiver 200, together with the geographical information (e.g., a map), on the display unit 40.

Figure 5:
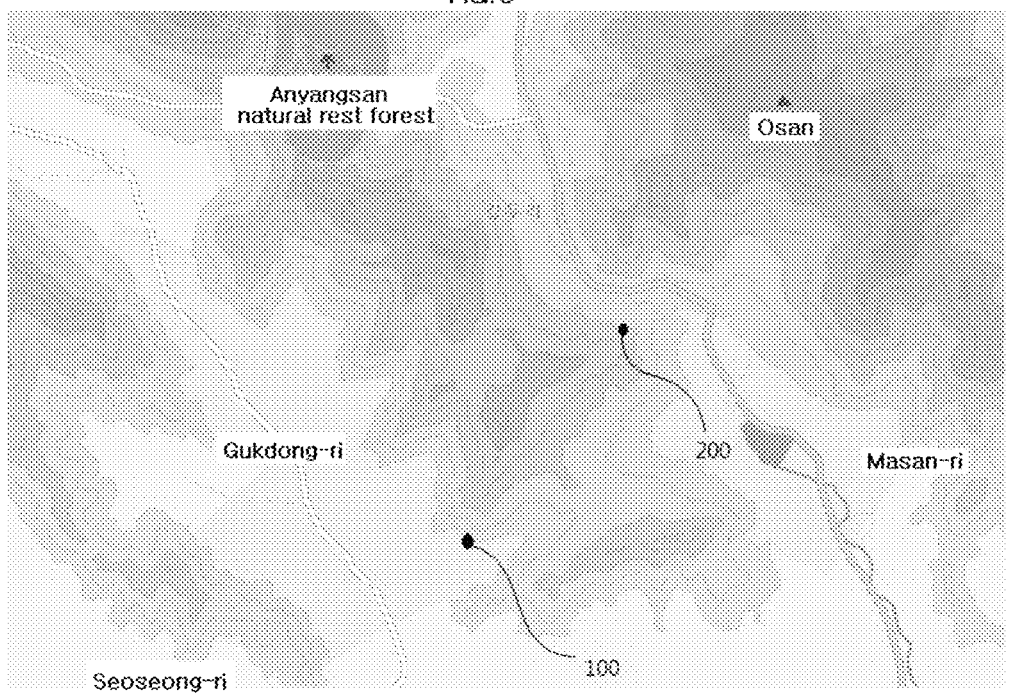
FIG. 5 shows an embodiment in which the locations of the portable device and the collar transceiver, together with a map, are displayed on the display unit of the portable device of the animal training apparatus according to the present invention.

FIG. 5 shows an embodiment in which the locations of the portable device and the collar transceiver, together with a map, are displayed on the display unit of the portable device of the animal training apparatus according to the present invention.

As shown in FIG. 5, the locations of the portable device 100 and the collar transceiver 200, together with a map downloaded from the geographical information server 400, are displayed on the display unit 40 of the portable device 100. Accordingly, since the owner of the hound 203 carrying the portable device 100 can accurately locate the hound 203 on the map, the owner of the hound 203 may determine whether to change or continue a daily hunting plan by measuring the direction and distance in which the hound is chasing.

FIG. 6 shows an embodiment in which the portable device and collar transceiver of the animal training apparatus according to the present invention generate rays of light in a dark location where there is no sunlight in automatic mode.

The collar control unit 70 according to the present invention receives an automatic mode signal from the portable device 100, sets the collar transceiver 200 to automatic mode, and determines whether the illumination of sunlight detected by the photodetector 90 in automatic mode corresponds to a bright location or a dark location. If, as a result of the determination, it is determined that the illumination of sunlight corresponds to the dark location, the collar control unit 70 determines whether the distance between the portable device 100 and the collar transceiver 200 is one at which the light of the collar transceiver 200 can be observed from the portable device 100 by periodically calculating the locations of the portable device 100 and the collar transceiver 200.

If the distance between the portable device 100 and the collar transceiver 200 is within several tens of meters (e.g., when the distance is one at which light can be observed) at a dark location, the collar control unit 70 controls the light output unit 80 so that a plurality of LEDs 81 generates light, thereby informing the owner of the hound 202 of the location of the hound 202.

Furthermore, if it is determined that the distance between the portable device 100 and the collar transceiver 200 is one at which light cannot be observed (e.g., the hound 202 is several kilometers away) as a result of periodically calculating the locations of the portable device 100 and the collar transceiver 200, the collar control unit 70 controls the light output unit 80 so that the plurality of LEDs 81 does not generate any light.

As described in conjunction with FIG. 4, however, the locations of the portable device 100 and the collar transceiver 200, together with the map, are displayed on the display unit 40 of the portable device 100, so that the owner of the hound can be informed of the accurate location of the hound 202 on the map.

Figure 7A:
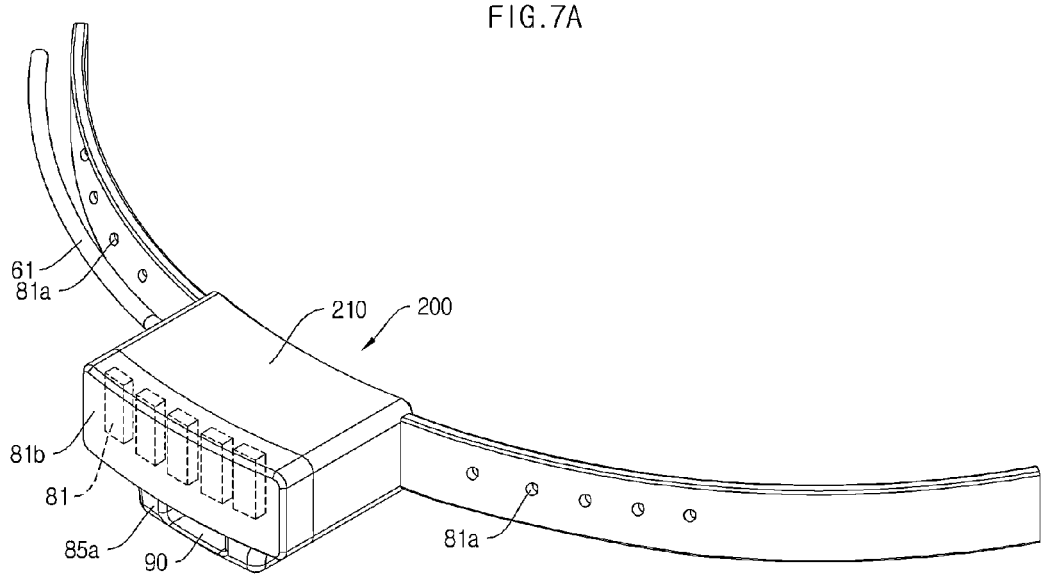
FIGS. 7A, 7B, and 7C are perspective, front and plan views showing a state of the collar transceiver of the animal training apparatus according to the present invention being worn on a collar.
Figure 7B:
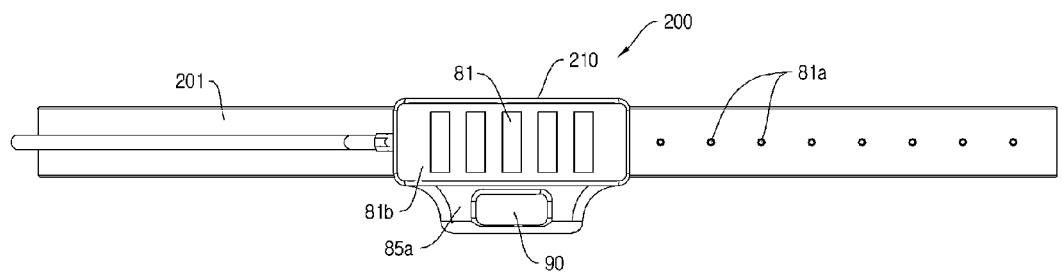
Figure 7C:
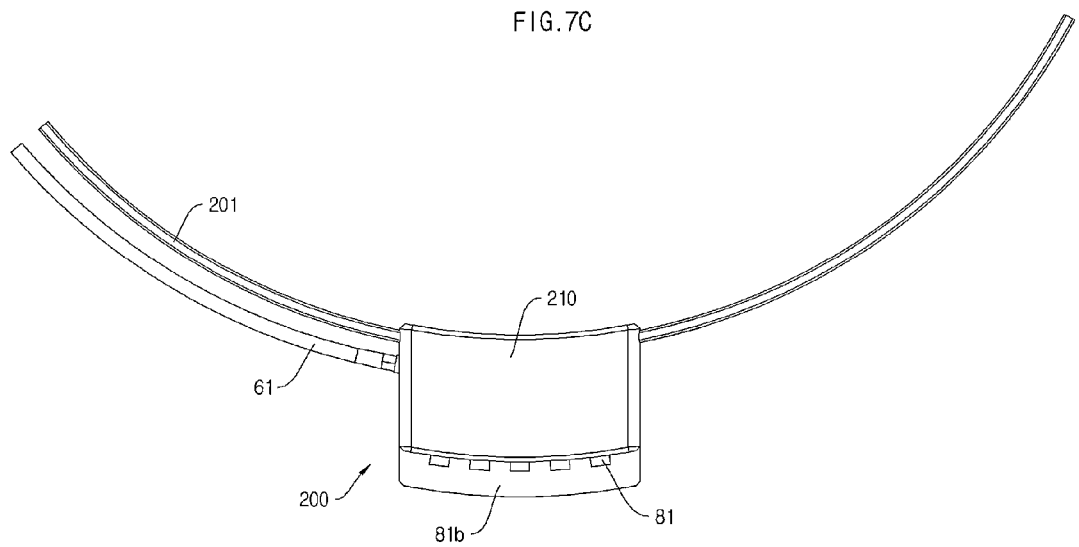

FIGS. 7A, 7B, and 7C are perspective, front and plan views showing a state in which the collar transceiver of the animal training apparatus according to the present invention is worn on a collar.

The collar transceiver 200 of the animal training apparatus according to the present invention includes a collar transceiver main body casing 210 which is inserted into the collar 201 of a pet and worn on the body (e.g., the neck or the shoulder) of the pet.

The collar wireless communication unit 60, the collar GPS reception unit 75, the collar control unit 70, the photodetector 90, the light output unit 80, and the beep tone output unit 85 are contained in the collar transceiver main body casing 210.

Here, the collar transceiver 200 is worn on the neck of the pet and is oriented downwards, and thus light faces downwards even when the LEDs 81 are installed in the collar transceiver 200. As shown in FIG. 7A, a plurality of LEDs 81a is installed in the collar 201 so that light can be irradiated from both sides of the pet.

Furthermore, as shown in FIGS. 7A and 7B, the plurality of LEDs 81 is installed in the front of the collar transceiver main body casing 210 so that light can be irradiated from the front of the pet when the pet wears the collar transceiver 200. Here, the plurality of LEDs 81 is covered with a cover 81b in order to protect the LEDs from an external impact, and the brightness of light varies depending on the direction because the LEDs 81 of the collar transceiver main body casing 210 are oriented downwards. In order to diffuse the light generated from the LEDs 81, the cover 81b has a convex front and four convex sides, and covers the LEDs 81.

As shown in FIG. 7B, the photodetector 90 is disposed below the LEDs 81, and is configured to determine whether a location is a bright location or a dark location by detecting the illumination of sunlight. Furthermore, a beep tone resonance box 85a is disposed below the LEDs 81, and is configured to resonate and output a beep tone output from the beep tone output unit 85.

The collar 201 is disposed on the sides and bottom of the collar transceiver 200, and thus light can be blocked by the collar 201 even when the LEDs are disposed on the sides and at the bottom. Accordingly, as shown in FIGS. 7A and 7B, the plurality of LEDs 81 is disposed in the collar 201 so that light can be irradiated in both directions.

Figure 8:
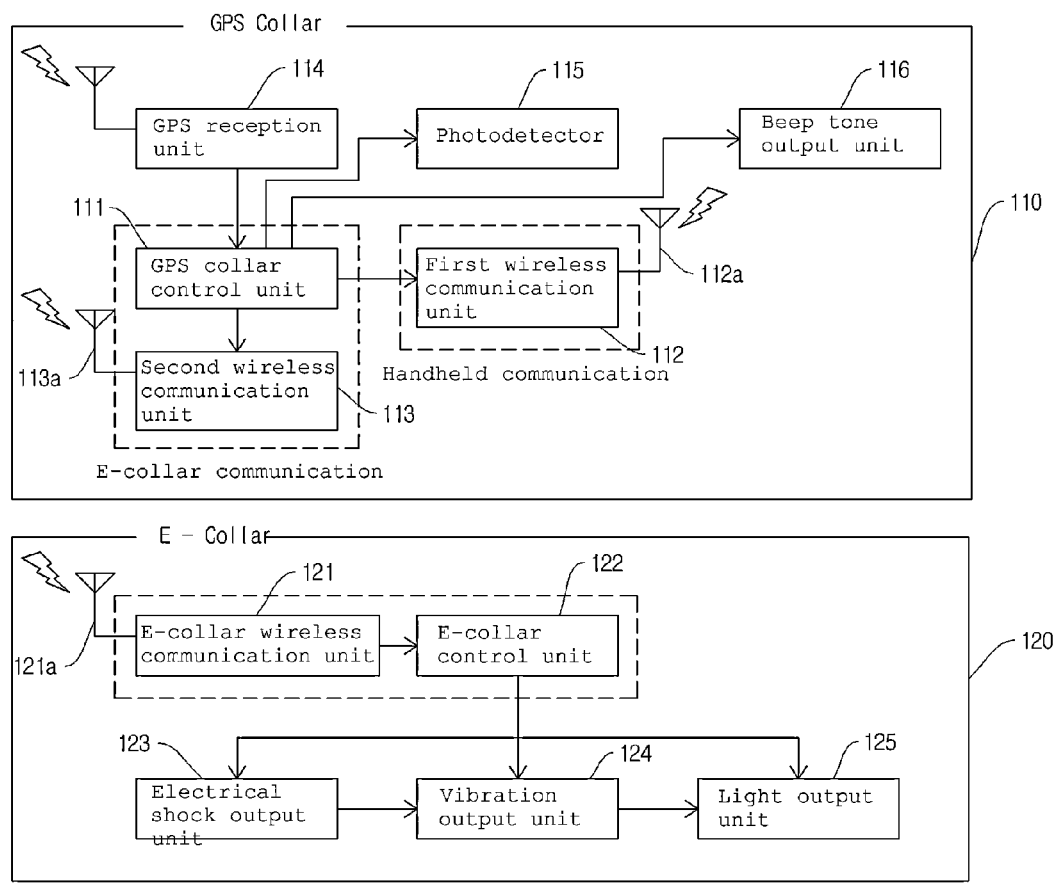
FIG. 8 is a block diagram showing an embodiment in which the collar transceiver of the animal training apparatus according to the present invention is separated into a GPS collar receiver and an E-collar receiver.

FIG. 8 is a block diagram showing an embodiment in which the collar transceiver of the animal training apparatus according to the present invention is separated into a GPS collar receiver and an E-collar receiver.

The collar transceiver according to the present embodiment includes a GPS collar receiver 110, and an E-collar receiver 120. The GPS collar receiver 110 and the E-collar receiver 120 may be used together or separately, if necessary.

The GPS collar receiver 110 according to the present embodiment includes a GPS reception unit 114 configured to receive GPS signals from the GPS satellites 300 and to extract location signals from the GPS signals; a photodetector 115 configured to generate a detection signal by detecting sunlight or ambient light; a beep tone output unit 116 configured to generate a beep tone under the control of a GPS collar control unit 111; a first wireless communication unit 112 configured to communicate with the E-collar receiver 120; a second wireless communication unit 113 configured to communicate with the portable device 100; and the GPS collar control unit 111 configured to control the elements of the GPS collar receiver 110. The GPS collar control unit 111 receives the location signals of the collar transceiver 200 from the GPS reception units 114 and the location signals of the portable device 100 from the portable device 100, and controls the first wireless communication unit 112 so that a control signal is transmitted to the E-collar receiver 120. Here, the control signal controls a light output unit 125 so that the light output unit 125 generates light, informing the trainer or the owner of the pet of the location of the collar transceiver 200, in the evening or at night when only weak illumination is provided by the sunlight based on the photo detection signal received from the photodetector 115 when an automatic mode signal is received depending on the distance between the collar transceiver 200 and the portable device 100. If the illumination of sunlight based on the photo detection signal received from the photodetector 115 corresponds to that of a bright location, the GPS collar control unit 111 controls the beep tone output unit 116 so that a beep tone is generated. Furthermore, the GPS collar control unit 111 controls the first wireless communication unit 112 so that signals, related to the electrical shock and vibration output and received using the second wireless communication unit 113, are transmitted to the E-collar receiver 120.

The E-collar receiver 120 according to the present invention includes an E-collar wireless communication unit 121 configured to communicate with the first wireless communication unit 112 of the GPS collar receiver 110; an E-collar control unit 122 configured to receive signals, the unit being used to generate an electrical shock and a vibration output, from the first wireless communication unit 112 of the GPS collar receiver 110 and to also receive a control signal, the control signal being used to performed control so that light informing the trainer or the owner of the pet of the location of the collar transceiver 200 is generated, from the light output unit 125, and to control an electrical shock output unit 123, a vibration output unit 124 and the light output unit 125; the electrical shock output unit 123 configured to generate the electrical shock under the control of the E-collar control unit 122; the vibration output unit 124 configured to generate vibrations under the control of the E-collar control unit 122; and the light output unit 125 configured to generate light under the control of the E-collar control unit 122.

Figure 9A:
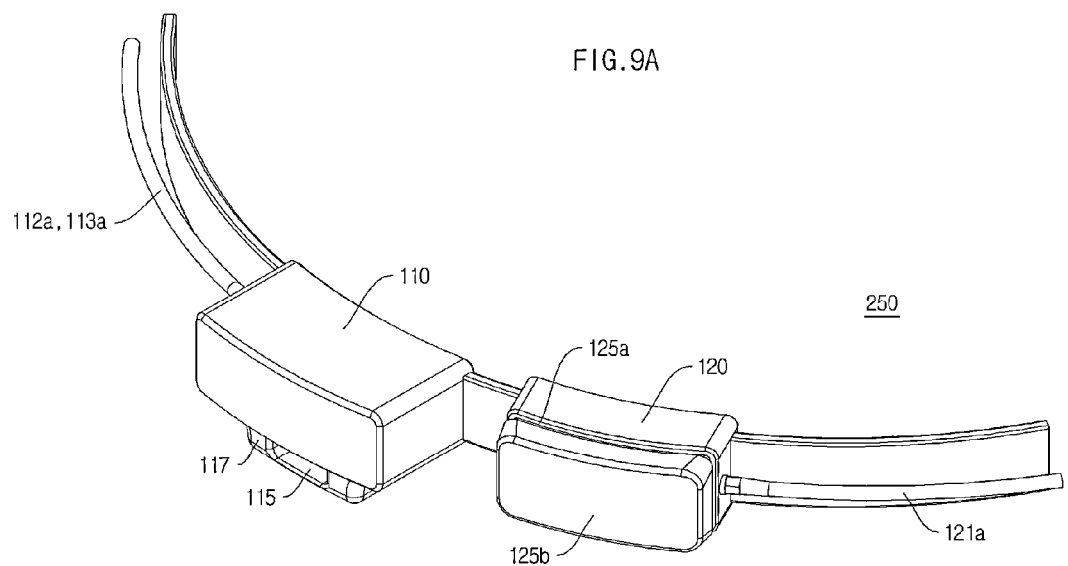
Figure 9C:
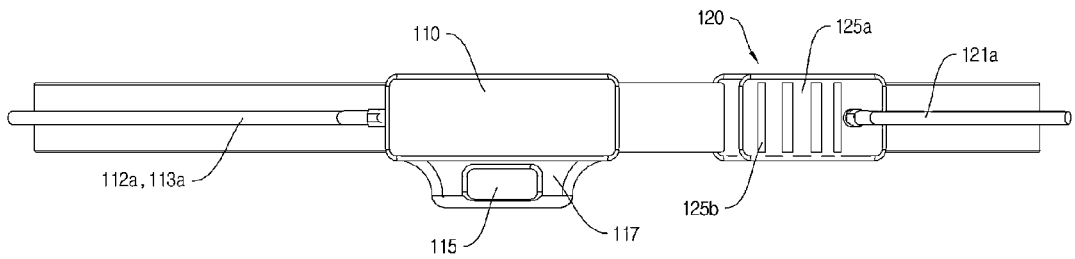

FIGS. 9A, 9B, and 9C are perspective, front and plan views showing a state in which the collar transceiver of the animal training apparatus according to the present invention is worn on a collar.

The collar transceiver 250 of the animal training apparatus according to the present embodiment includes the GPS collar receiver 110 and the E-collar receiver 120 which are inserted into the collar 201 of a pet and are worn on the body (e.g., the neck or the shoulder) of the pet.

The GPS collar receiver 110 includes the GPS collar control unit 111, the first wireless communication unit 112, the second wireless communication unit 113, the GPS reception unit 114, the photodetector 115, and the beep tone output unit 116. If the GPS collar receiver 110 is separate from the E-collar receiver 120, the GPS reception unit 114 of the GPS collar receiver 110 may track the location of the pet wearing the GPS collar receiver 110 by receiving location signals from the GPS satellites 300, calculating the location, and transmitting the calculated location to the portable device 100.

As shown in FIG. 9A, both the photodetector 115 and a resonance box 117 for generating a beep tone are disposed on the bottom of the GPS collar receiver 110. Radio antennas 112a and 113a are disposed on the left side of the GPS collar receiver 110, and are used for transmission and reception with the E-collar receiver 120.

The E-collar receiver 120 includes the E-collar wireless communication unit 121, the E-collar control unit 122, the electrical shock output unit 123, the vibration output unit 124, and the light output unit 125. As shown in FIG. 9A, a plurality of LEDs 125a and a protection cover 125b, made of transparent material and configured to cover the plurality of LEDs 125a, are disposed in the front of the E-collar receiver 120.

A radio antenna 121a is disposed on the right side of the E-collar receiver 120, and receives signals from the GPS collar receiver 110. The E-collar receiver 120 periodically calculates the locations of the portable device 100 and the collar transceiver 200 at a dark location in automatic mode. If the distance between the portable device 100 and the collar transceiver 200 is one at which light generated from the collar transceiver 200 can be observed from the portable device 100 (i.e., several tens of meters away), the E-collar receiver 120 controls the light output unit 125 so that light is generated in order to inform the trainer or the owner of the pet of the location of the pet.

A pair of electrode terminals 123a for applying an electrical shock is disposed inside the E-collar receiver 120 (i.e., on the face contacting the skin of the pet) so that the electrical shock is applied to the skin of the pet, wearing the E-collar receiver 120, in response to an electrical shock application signal transmitted by the portable device 100.

FIG. 10 is a flowchart illustrating a method of controlling the portable device and a collar transceiver of the animal training apparatus according to the present invention.

The method of controlling the animal training apparatus according to the present invention corresponds to a subroutine program that is executed by interrupts at specific intervals while a main program is being executed.

At step S1, the collar control unit 70 receives location signals from the collar GPS reception unit 75 in response to interrupt signals generated at specific intervals during the execution of the main program which controls the animal training apparatus according to the present invention, and calculates coordinate values indicative of the location of the collar transceiver 200 based on the received location signal.

At step S2, the collar control unit 70 receives the location signals of the portable device 100 from the collar wireless communication unit 60, and calculates coordinate values indicative of the location of the portable device 100 based on the received location signals.

At step S3, the collar control unit 70 calculates the distance between the portable device 100 and the collar transceiver 200 based on the coordinate values indicative of the location of the collar transceiver 200 and the coordinate values indicative of the location of the portable device 100. If the calculated distance is several kilometers or more, the collar control unit 70 transmits the location signals of the collar transceiver 200 to the portable device 100 using the collar wireless communication unit 60 at step S10, and returns to the main program.

Furthermore, the collar control unit 70 calculates the distance between the portable device 100 and the collar transceiver 200 at step S3. If the calculated distance is within several tens of meters, the collar control unit 70 proceeds to step S4.

At step S4, the collar control unit 70 transmits the location signals of the collar transceiver 200 to the portable device 100 using the collar wireless communication unit 60.

At step S5, the collar control unit 70 determines whether the manual mode selection key or automatic mode selection key of the portable device 100 has been pressed using the collar wireless communication unit 60. If, as a result of the determination, it is determined that the manual mode selection key has been pressed, the collar control unit 70 sets the collar transceiver 200 to manual mode, and proceeds to step S6.

The collar control unit 70 reads the current function of the collar transceiver 200 at step S6, and determines whether the collar transceiver 200 has been set to the beep tone generation function or the light generation function at step S7. If, as a result of the determination, it is determined that the collar transceiver 200 has been set to the beep tone generation function, the collar control unit 70 proceeds to step S8, controls the beep tone output unit 85 so that a beep tone is generated, and then returns to the main program.

If, as a result of the determination at step S7, it is determined that the collar transceiver 200 has been set to the light generation function, the collar control unit 70 proceeds to step S9, controls the light output unit 85 so that light is generated from the plurality of LEDs 81, and then returns to the main program.

If, as a result of the determination at step S5, it is determined that the automatic mode selection key has been pressed, the collar control unit 70 sets the collar transceiver 200 to manual mode, and proceeds to step S11. The collar control unit 70 detects the illumination of sunlight received from the photodetector 90 at step S11, and determines whether the detected illumination of sunlight corresponds to a bright location or a dark location at step S12.

If, as a result of the determination at step S12, it is determined that the detected illumination of sunlight corresponds to the bright location, the collar control unit 70 controls the beep tone output unit 85 so that a beep tone is generated at step S13, and then returns to the main program.

If, as a result of the determination at step S12, it is determined that the detected illumination of sunlight corresponds to the dark location, the collar control unit 70 controls the light output unit 85 so that light is generated from the plurality of LEDs 81 at step S14, and then returns to the main program.

As described above, according to the present invention, the GPS receiver is provided in the portable device, and thus a service for measuring a distance to the collar transceiver using the GPS function can be provided. The distance between the portable device and the collar transceiver is calculated based on location signals received from the GPS receiver. When the portable device and the collar transceiver approach each other and reach a location at which the beep tone can be heard or the light can be observed, the beep tone is generated at a bright location so that the collar transceiver can be located, and the light is generated at a dark location so that the collar transceiver can be located.

According to the present invention, a pet wearing the collar transceiver can be located based on distance information calculated by the portable device and the collar transceiver having a GPS function, and the direction and distance can be found and tracked even at a remote location. Accordingly, the present invention has the convenient advantage of being able to easily relocate a pet.

Although the preferred embodiments of the present invention have been disclosed for illustrative purposes, those skilled in the art will appreciate that a variety of modifications, additions and substitutions are possible, without departing from the scope and spirit of the invention as disclosed in the accompanying claims.

What is claimed is:

1. An animal training system for locating a collar transceiver using a Global Positioning System (GPS), the animal training system comprising:
    a portable device comprising:
        a portable device GPS reception unit configured to be carried by a trainer or an owner of a pet and to receive GPS signals from GPS satellites and then extract location signals from the GPS signals;
        a key input unit configured to receive and then output data and command signals input by the trainer or the owner of the pet;
        a portable device control unit configured to:
            control the elements of the portable device based on the command signals received from the key input unit,
            to perform control so that the location signals received from the portable device GPS reception unit are output to the collar transceiver via a portable device wireless communication unit, and
            to receive results of calculating a distance between the portable device and the collar transceiver and to display the locations of the portable device and the collar transceiver, together with a map downloaded from a geographical information server, on a display unit of the portable device if the distance between the collar transceiver and the portable device is too far to see light from a light output unit and hear a beep tone from a beep tone output unit;
        wherein the display unit is configured to display an operating status of the portable device and data under control of the portable device control unit; and
        wherein the portable device wireless communication unit is configured to transmit data to the collar transceiver under control of the portable device control unit; and
    wherein the collar transceiver comprises:
        a collar wireless communication unit worn on the pet of the trainer or the owner, and configured to receive radio signals, including a variety of data and command signals, from the portable device;
        a collar GPS reception unit configured to extract location signals from GPS signals received from GPS satellites;
        a photodetector configured to detect sunlight or ambient light and to output a detection signal;
        wherein the light output unit is configured to output the light under control of a collar control unit;
        wherein the beep tone output unit is configured to output the beep tone under control of the collar control unit; and
        wherein the collar control unit is configured to:
            control the elements of the collar transceiver,
            to receive the location signals of the collar transceiver from the collar GPS reception unit and the location signal from the portable device,
            to perform control so that the results of calculating the distance between the portable device and the collar transceiver is output to the portable device via the collar wireless communication unit,
            to perform control so that the light output unit generates light, informing the trainer or the owner of the pet of the location of the collar transceiver, when an automatic mode signal is received in the evening or at night when weak illumination is provided by the sunlight in response to a photo detection signal detected by the photodetector depending on the distance between the collar transceiver and the portable device,
            to detect an illumination of sunlight in response to the photo detection signal of the photodetector, and
            to perform control so that the beep tone output unit generates the beep tone at day based on the illumination of sunlight displaying the locations of the portable device.

2. The animal training system as set forth in claim 1, wherein the key input unit comprises a level setting button for setting a level of vibrations or shocks of the collar transceiver, an on/off button for turning on/off power, a beep tone output button for outputting a beep tone in manual mode, a light output button for outputting light in the manual mode, and a manual/automatic selection button for selecting the manual mode in which the beep tone output and the light output are manually operated and an automatic mode in which the beep tone output and the light output automatically operate.

3. The animal training system as set forth in claim 1, wherein the portable device control unit downloads geographical information from a geographical information server via the portable device wireless communication unit, stores the downloaded geographical information in internal memory, receives the location signals from the portable device GPS reception unit, and displays locations of the portable device and the collar transceiver, together with the geographical information, on the display unit.

4. The animal training system as set forth in claim 1, wherein:
    the collar control unit receives the location signals of the collar transceiver from the collar GPS reception unit and the automatic mode signal from the portable device, sets the collar transceiver to automatic mode, compares the locations of the collar transceiver and the portable device if it is determined that the illumination of sunlight detected by the photodetector corresponds to a bright location, and controls the beep tone output unit so that the beep tone is generated depending on the distance between the portable device and the collar transceiver, compares the locations of the collar transceiver and the portable device if it is determined that the illumination of sunlight detected by the photodetector corresponds to a bright location, and controls the light output unit so that the LEDs generate the light depending on the distance between the portable device and the collar transceiver.

5. A method of controlling an animal training system, comprising the steps of:

(a) a collar control unit receiving location signals from a collar GPS reception unit, calculating coordinate values indicative of a location of a collar transceiver, receiving location signals of a portable device from a collar wireless communication unit, and calculating coordinate values indicative of a location of the portable device;

(b) the collar control unit calculating a distance between the portable device and the collar transceiver based on the coordinate values indicative of the location of the collar transceiver and the coordinate values indicative of the location of the portable device, and performing control so that the result of calculating the distance is output to the portable device via a collar wireless communication unit whereby the portable device control unit controls a display unit to display the locations of the portable device and the collar transceiver, together with a map downloaded from a geographical information server, on the display unit of the portable device if the calculated distance is several kilometers or more or if the distance between the collar transceiver and the portable device is too far to see light from a light output unit and hear a beep tone from a beep tone output unit;

(c) if the distance between the portable device and the collar transceiver is calculated and the calculated distance is within several tens of meters at step (b), the collar control unit determining whether manual mode selection key or automatic mode selection key of the portable device has been pressed via the collar wireless communication unit;

(d) if, as a result of the determination at step (c), it is determined that the manual mode selection key has been pressed, the collar control unit setting the collar transceiver to manual mode, reading a current function of the collar transceiver, and determining whether the collar transceiver has been set to a beep tone generation function or a light generation function;

(e) if, as a result of the determination at step (d), it is determined that the collar transceiver has been set to the beep tone generation function, the collar control unit controlling the beep tone output unit so that the beep tone output unit generates the beep tone, and then returning to a main program;

(f) if, as a result of the determination at step (d), it is determined that the collar transceiver has been set to the light generation function, the collar control unit controlling the light output unit so that a plurality of LEDs generates light, and then returning to the main program;

(g) if, as a result of the determination at step (c), it is determined that the automatic mode selection key has been pressed, the collar control unit setting the collar transceiver to automatic mode, detecting an illumination of sunlight received from a photodetector, and determining whether the detected illumination of sunlight corresponds to day, evening or night; and (h) if, as a result of the determination at step (g), it is determined that the detected illumination of sunlight corresponds to day, the collar control unit controlling the beep tone output unit so that the beep tone output unit generates the beep tone, and then returning to the main program, or if, as a result of the determination at step (g), it is determined that the detected illumination of sunlight corresponds to the evening or night, the collar control unit controlling the light output unit so that the plurality of LEDs generates the light, and then returning to the main program.

* * * * *